June 19, 1951
A. GERSTENBERG
2,557,649
MACHINE FOR KNEADING AND CONVEYING
PLASTIC SUBSTANCES
Filed May 17, 1947
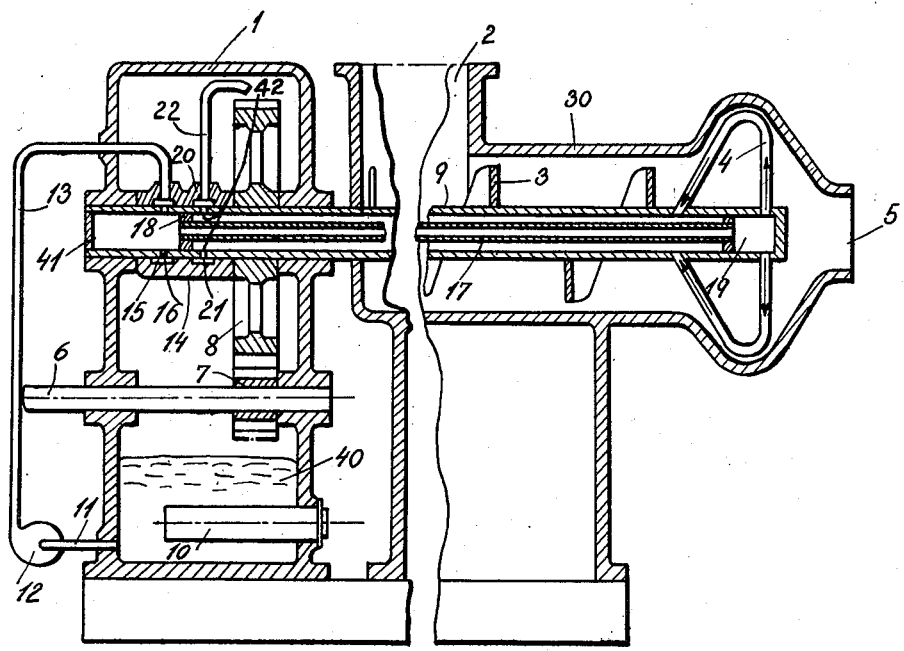
Aage Gerstenberg
By Fraser, Myers & Manley
Attys.

Patented June 19, 1951

2,557,649

UNITED STATES PATENT OFFICE 2,557,649

MACHINE FOR KNEADING AND CONVEYING PLASTIC SUBSTANCES

Aage Gerstenberg, Copenhagen, Denmark

Application May 17, 1947, Serial No. 748,822
In Denmark August 26, 1946

6 Claims. (Cl. 257—73)

This invention relates to an improvement in machines for kneading and conveying plastic matters, especially edible fats such as margarine or butter.

In machines of this kind it is often desirable to heat the movable conveying or kneading members and to this end it has been proposed to circulate water of a suitable temperature through cavities in said members. This water is ordinarily received from a vessel, the temperature of which is maintained at a certain value, and the water is circulated through the said members by way of a pump. It is obligatory to use stuffing boxes at the inlets and outlets through which the water passes into and leaves the said members, and this requirement complicates machines of this kind rather considerably.

Today the movable kneading and conveying members in machines of the kind referred to are ordinarily operated by way of a gearing device, being located in a gear box, which box contains a certain amount of liquid lubricants such as oil for the lubrication of the toothed wheels, chains, bearings, etc. in the said box.

The object of the present invention is to use the said amount of oil for an additional purpose, e. g. as a substitution for the water, which previously was used for heating the movable kneading members of machines of the kind referred to. This additional use of the said oil makes it possible to dispense with the use of stuffing boxes and similar tightening means in the path of circulation of the heating medium, e. g. the said oil, because the oil can be supplied to the member to be heated through apertures located within the gear box, and may be removed from the said member through outlets being also located within the gear box. The connection between the channels by way of which the oil is circulated through the said members and through the remaining parts of the oil circulation system need ordinarily not be perfectly tight.

A further advantage of an arrangement according to the present invention is the possibility of utilizing the heat being gradually accumulated in the oil in the gear box on account of the working losses in the same, for the purpose of heating the movable members of the kneading and conveying machine.

At the start of the machine the oil in the gear box would ordinarily be cold, and therefore it is under certain circumstances desirable also to be able to heat the oil otherwise than by way of losses during the operation of the machine, and to this end a proper heating member such as an electrical heater or a tubular heating member adapted to be passed by hot water or steam, may be arranged in the gear box. By means of a pump, being preferably arranged outside the gear box—or if desired within same—and being driven either by a separate motor or by way of the gear, the oil is circulated through one or several of the movable members of the movable kneading or conveying members.

If the gear box is provided with an oil pump for the lubrication of toothed wheel, bearings etc., this pump may also be used for the circulation of oil through the movable kneading or conveying members in which way it is rendered possible to heat the said members without using any special circulation device for this purpose.

During the operation of a machine of the said kind it may happen that the oil in the gear box will gradually be too hot to be used for the heating of the kneading or conveying members, and in such cases it will be convenient, according to the invention, to supply the gear box or the oil circulation system with members for cooling the oil. If the oil is to be heated by way of water or steam which is passed through a tubular heating coil or the like, the said cooling may be effected in a very simple way, viz. by passing cold water through the said tubular coil after having interrupted the supply of the heating medium to the said coil.

The drawing shows a longitudinal section through an embodiment of a kneading machine according to the invention.

30 is the casing of a kneading machine comprising a rotary kneading member 4 and a worm 3 adapted to convey a fatty substance from the inlet hopper 2 to the kneading member. The worm 3 and the kneading member are rigidly interconnected and driven by a motor not shown, which is coupled to a shaft 6 and geared to the shaft 9 of the worm by way of gear wheels 7 and 8 in the gear box 1. 5 is the discharge aperture of the kneading machine.

The gear box contains a certain quantity of oil 40, and for the heating of this oil there may be provided in the gear box a heating member 10, which for instance may be an electrical heater or a tube coil, adapted to be passed by steam or more or less hot water. This heating member may, however, in some cases be dispensed with. The oil passes through a tube 11 on to an oil pump 12 by way of which the oil is fed through a tube 13 to a radially disposed boring in a stationary bush 14 which is slidably fitted round the shaft 9. From the tube 13 the oil flows into an annular chamber 15 in the bush, and from this chamber the oil enters a chamber 41 in one end of the hollow shaft 9 through one or more radially disposed borings 16 in the wall of the hollow shaft 9. A tube 17 is axially disposed in the shaft 9 and supported by two partitions 18, 19 in the said shaft. The oil flows from the chamber 41 through this tube 17 to the opposite end of the shaft 9, and there the oil enters one end of a number of V-shaped tubes 4, which are uniformly distributed in radial positions around the circumference of the shaft 9 and attached to same. These tubes 4 form together the kneading member, and one end of each of the tubes communicates with the interior of the end of the shaft 9, outside the adjacent end of the tube 17, while the other end of each of the tubes 4 communicates with the annular space between the wall of the shaft 9 and the tube 17, which annular space is closed at both ends by way of the partitions 18 and 19.

The circulating oil enters the said annular space from the tubes 4 and leaves the said annular space through radially disposed borings 42, communicating with a second chamber 21 in the bush 14. In the illustrated embodiment this chamber is communicated with a tube 22, which directs the oil up to the top side of the toothed wheel 8, but instead of causing the oil to flow through this tube the oil may be caused to flow directly into the gear box or to flow to other lubricating places in the box from which the oil returns to the gear box.

In addition to the heating body 10 there may, for instance if the latter is an electrical heating body, be arranged separate members for cooling of the oil in the gear box if during the operation of the machine the oil should grow too hot. If the heating member 10 is a tube coil, the latter may alternately be used for the said cooling purpose, viz. by conducting cold water through the same.

In the above specification it is supposed that the heating medium is lubricating oil, but it is within the scope of the invention to use any other medium having a lubricating property, e. g. glycerine.

Having now particularly described and ascertained the nature of my invention and in what manner the same is to be performed I declare that what I claim is:

1. In material processing apparatus, in combination, a casing, a processing chamber in said casing formed with an inlet permitting introduction of material to be processed into said chamber and an outlet permitting discharge of processed material from said chamber, a box including a lubricant reservoir therein, a tubular shaft extending into both said chamber and said box and having separate, longitudinal, fluid-conducting passages therein both having their opposite extremities extending into said chamber and said box, processing means carried upon said shaft in heat-exchange relation to at least one of said passages and located within the said chamber, a gearing device located in said box and coupled to said shaft, a fluid-conducting circulating system connected between said reservoir and said gearing device, for circulating lubricant therebetween, means at the corresponding extremities of said longitudinal passages within the said chamber affording fluid communication between the said passages, and means, at the opposite extremities of said passages and within the said box, separately connecting said passages in series in said circulating system.

2. In material processing apparatus, the combination according to claim 1, the said processing means comprising a kneading member having a duct therein connected between said longitudinal shaft passages.

3. In material processing apparatus, the combination according to claim 1, the said longitudinal shaft passages being coaxial.

4. A material processing apparatus, comprising processing means having a cavity with walls in heat exchange relationship with operating surfaces thereof, driving means for said processing means including gearing means in a gear box, conduits connecting said gear box and said cavity to form a closed lubricant circulation circuit, means in said circuit for positively circulating lubricant therein, and a casing surrounding said processing means and defining a chamber between said operating surfaces and the inner face of said casing; the walls of said casing having an aperture for introducing the material to be treated into said chamber and a second aperture for discharging the said material from said chamber.

5. A material processing apparatus, comprising a shaft, processing means carried by said shaft, driving means for said shaft including gearing means in a gear box, said shaft extending into said gear box and being provided in the portion of same located in the gear box with inlet and outlet openings leading to cavities having walls in heat exchange relationship with the operating surfaces of said processing means, conduits connecting said inlet and outlet openings with different zones in said gear box to form a lubricant circulation circuit, means in said circuit for positively circulating lubricant therein, and a casing surrounding said processing means, and forming a chamber between said operating surfaces and the inner face of said casing; the walls of said casing having an aperture for introducing the material to be treated into said chamber and a second aperture for discharging the said material from said chamber.

6. An apparatus for kneading plastic substances comprising a worm conveyor and a number of kneading members arranged for rotation about a common axis and provided with passages having walls in heat exchange relationship with operating surfaces of said worm conveyor and said kneading members, a casing surrounding said worm conveyor and said kneading members and defining a kneading chamber between the said operating surfaces and the inner faces of said casing, driving means for said worm conveyor and said kneading members including gear means in a gear box, conduits connecting said passages with said gear box to form a closed lubricant circulation circuit, and means in said lubricant circulation circuit for positively circulating lubricant therein; the walls of said casing having an aperture for introducing the material to be treated into said chamber and a second aperture for discharging the said material from the said chamber.

AAGE GERSTENBERG.

REFERENCES CITED

The following references are of record in the file of this patent:

UNITED STATES PATENTS

| Number | Name | Date |
|---|---|---|
| 2,108,977 | Vullierme | Feb. 22, 1938 |
| 2,328,395 | Neuman | Aug. 31, 1943 |